United States Patent
Dwork

[19]

[11] Patent Number: 6,094,443
[45] Date of Patent: Jul. 25, 2000

[54] APPARATUS AND METHOD FOR DETECTING A PRESCRIBED PATTERN IN A DATA STREAM BY SELECTIVELY SKIPPING GROUPS OF NONRELEVANT DATA BYTES

[75] Inventor: Jeffrey Roy Dwork, San Jose, Calif.

[73] Assignee: Advanced Micro Devices, Inc., Sunnyvale, Calif.

[21] Appl. No.: 08/961,023

[22] Filed: Oct. 30, 1997

[51] Int. Cl.[7] .................................. H04J 3/06; H04L 7/00
[52] U.S. Cl. .......................... 370/510; 370/514; 370/515; 375/365; 375/366; 375/368
[58] Field of Search ...................... 370/510, 511, 370/512, 513, 514, 515, 509, 503; 375/365, 366, 367, 368; 714/819

[56] References Cited

U.S. PATENT DOCUMENTS

| | | | |
|---|---|---|---|
| 5,483,539 | 1/1996 | Kaufmann | 375/368 |
| 5,557,614 | 9/1996 | Sandler et al. | 370/509 |
| 5,557,742 | 9/1996 | Smaha et al. | 714/819 |
| 5,590,159 | 12/1996 | Anderson | 375/340 |
| 5,608,734 | 3/1997 | Sandler et al. | 370/509 |
| 5,742,647 | 4/1998 | Chaisemartin | 375/366 |
| 5,903,619 | 5/1999 | Chaisemartin | 375/366 |
| 5,982,786 | 11/1999 | Grivna | 370/503 |

OTHER PUBLICATIONS

Al–Subbagh et al. "Optimum Patterns for Frame Alignment", Dec. 1998, pp. 594–603.
Christodoulides et al. "Frame Synchronisation using two frame alignment words", Jan. 1994, pp. 104–106.

*Primary Examiner*—Alpus H. Hsu
*Assistant Examiner*—Afsar M. Qureshi

[57] ABSTRACT

A network interface in a workstation computer includes a pattern matching circuit to enable the workstation computer to wake up to perform prescribed operations requested by a remote workstation. The pattern recognition circuit includes a pattern memory configured for storing a pattern entry for at least a portion of a predetermined pattern. The pattern entry includes a pattern data field and a second field specifying a number of bytes in the input data stream to be ignored prior to comparison with the pattern data field. The pattern matching circuit also includes a comparator for comparing the pattern data field with a selected group of bytes from the data stream. Pattern match logic determines whether the received data packet includes the predetermined pattern based on the comparison result. The second field enables the comparator to selectively ignore a number of bytes in the data stream prior to comparison with a pattern data field, minimizing the amount of null data values that need to be stored in pattern memory. Hence, the second data field enables efficient compression of pattern data in memory.

20 Claims, 7 Drawing Sheets

APPARATUS AND METHOD FOR DETECTING A PRESCRIBED PATTERN IN A DATA STREAM BY SELECTIVELY SKIPPING GROUPS OF NONRELEVANT DATA BYTES

BACKGROUND OF THE INVENTION

1. Technical Field

The present invention relates to pattern recognition, more specifically to arrangements for storing pattern data in memory in network workstations for use in detecting prescribed patterns in data streams.

2. Description of the Related Art

Workstation computers are currently being designed to include power saving mechanisms, where the workstation computer will shut itself down after a prescribed interval of inactivity.

One proposal for a power saving mechanism specifies a wake-up routine for the workstation computer, where a network interface to a network such as an Ethernet-type or IEEE 802.3 network maintains power to receive data packets from a network. Upon receiving a data packet having a prescribed pattern, the network interface causes the workstation computer to "wake up," for example to perform a prescribed operation requested by a remote workstation.

A problem encountered in implementing this type of wake up scheme is that the network interface device needs to be able to recognize certain patterns of data. The patterns typically are composed of specific bytes within the received data packet that must match a prescribed pattern, and other data bytes that are irrelevant to the pattern recognition and thus should be ignored. One possible solution is to store in memory a sequence of data bytes having a pattern identical to a received data packet, where a byte-by-byte comparison is made between the stored data and the received packet data. Such an arrangement, however, suffers from the disadvantage that additional overhead is necessary to enable the comparison hardware to distinguish the relevant bytes in the pattern comparison from the non-relevant (i.e., don't care) bytes stored in the memory. Moreover, since the received data packets may include a substantially large number of bytes that are ignored as don't care, the storage of null data in memory corresponding to bytes that are ignored in the received data packet results in a substantial waste of memory space.

SUMMARY OF THE INVENTION

There is a need for an arrangement that enables detection of a prescribed pattern in a data stream having a plurality of non-relevant data bytes, that minimizes the required storage space for the pattern to be detected.

There is also a need for an arrangement that enables a received data stream to be compared simultaneously to multiple prescribed patterns using a minimal amount of memory for storing pattern data.

There is also a need for an arrangement that efficiently detects a prescribed pattern in a data stream by selectively discarding data bytes from the data stream that are not relevant to the detection of the prescribed pattern.

There is also a need for an arrangement for compressing pattern data in memory for comparison with a data stream having a plurality of non-relevant data bytes within the pattern to be detected.

These and other needs are attained by the present invention, where groups of data bytes from the data stream are selectively discarded during a comparison between the data stream and pattern data stored in a pattern memory based on a corresponding data field that identifies data bytes of the data stream to be ignored.

According to one aspect of the present invention, an apparatus for detecting a prescribed pattern in a data stream comprises a pattern memory configured for storing a pattern entry specifying at least a portion of the prescribed pattern, the pattern entry including a pattern data field and a second field specifying a number of bytes in the data stream to be ignored prior to comparison with the pattern data field, and a comparator for comparing the pattern data field with a selected contiguous group of bytes of the data stream based on the second field and outputting a comparison result. The second field in each pattern entry enables the comparator to selectively ignore a number of bytes in the data stream prior to comparison with the pattern data field, minimizing the necessity of null data values in the pattern memory. Hence, the size of the stored patterns in the pattern memory can be reduced by approximately 50%.

Another aspect of the present invention provides a method for detecting a prescribed pattern in a data stream, comprising storing in a memory a plurality of pattern entries having a sequence corresponding to the prescribed pattern, each pattern entry including a pattern data field storing pattern bytes corresponding to the prescribed pattern and a second field storing a second field value, receiving the data stream, reading a selected one of the pattern entries based on a start position of the received data stream, selectively discarding at least one group of contiguous data bytes from the data stream based on the second field of the corresponding one pattern entry, comparing the pattern bytes from the one pattern entry with a second group of data bytes from the data stream, contiguous with and following the selectively discarded group, and outputting a comparison result, and detecting the prescribed pattern in the data stream based on the detected comparison results for the respective pattern entries. The storing of pattern entries in a sequence corresponding to a prescribed pattern to be detected, in combination with selectively discarding a group of contiguous data bytes from the data stream based on a field of the corresponding pattern entry, minimizes the number of pattern entries necessary to specify a prescribed pattern in the memory.

Still another aspect of the present invention provides a method in a network interface for identifying a prescribed pattern in a data packet, comprising receiving the data packet by a media access controller from a packet switched network, and detecting the prescribed pattern in the received data packet, comprising (1) reading a selected pattern entry, based on a start position of the received data packet, from a memory storing a plurality of the pattern entries having a prescribed sequence corresponding to the prescribed pattern, (2) selectively latching a group of data bytes from the data packet based on a skip field in the selected pattern entry, (3) selectively comparing the latched group of data bytes from the data packet with pattern data in the selected pattern entry based on corresponding mask bits in the selected pattern entry to obtain a comparison result relative to the selected pattern entry, and (4) accumulating the comparison results for the respective pattern entries, relative to the prescribed sequence and the contiguous groups of data bytes, to detect the prescribed pattern. The selective latching of a group of data bytes from the data packet based on the skip field enables efficient comparison between relevant bytes in the received data packet and the pattern entries stored in the memory. Moreover, the reading of a selected pattern entry based on the start position of the received data packet enables multiple pattern detection schemes to be implemented simultaneously. Hence, a received data packet can be simultaneously compared with multiple prescribed data patterns, with a minimal amount of storage space for storing the prescribed data patterns.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface in a packet switched network, such as an Ethernet (IEEE 802.3) network. A description will first be given of the network interface architecture, followed by the arrangement for detecting a prescribed pattern in a received data packet. It will become apparent, however, that the present invention is also applicable to other network interface systems.

NETWORK INTERFACE ARCHITECTURE

Figures 1, 1A:
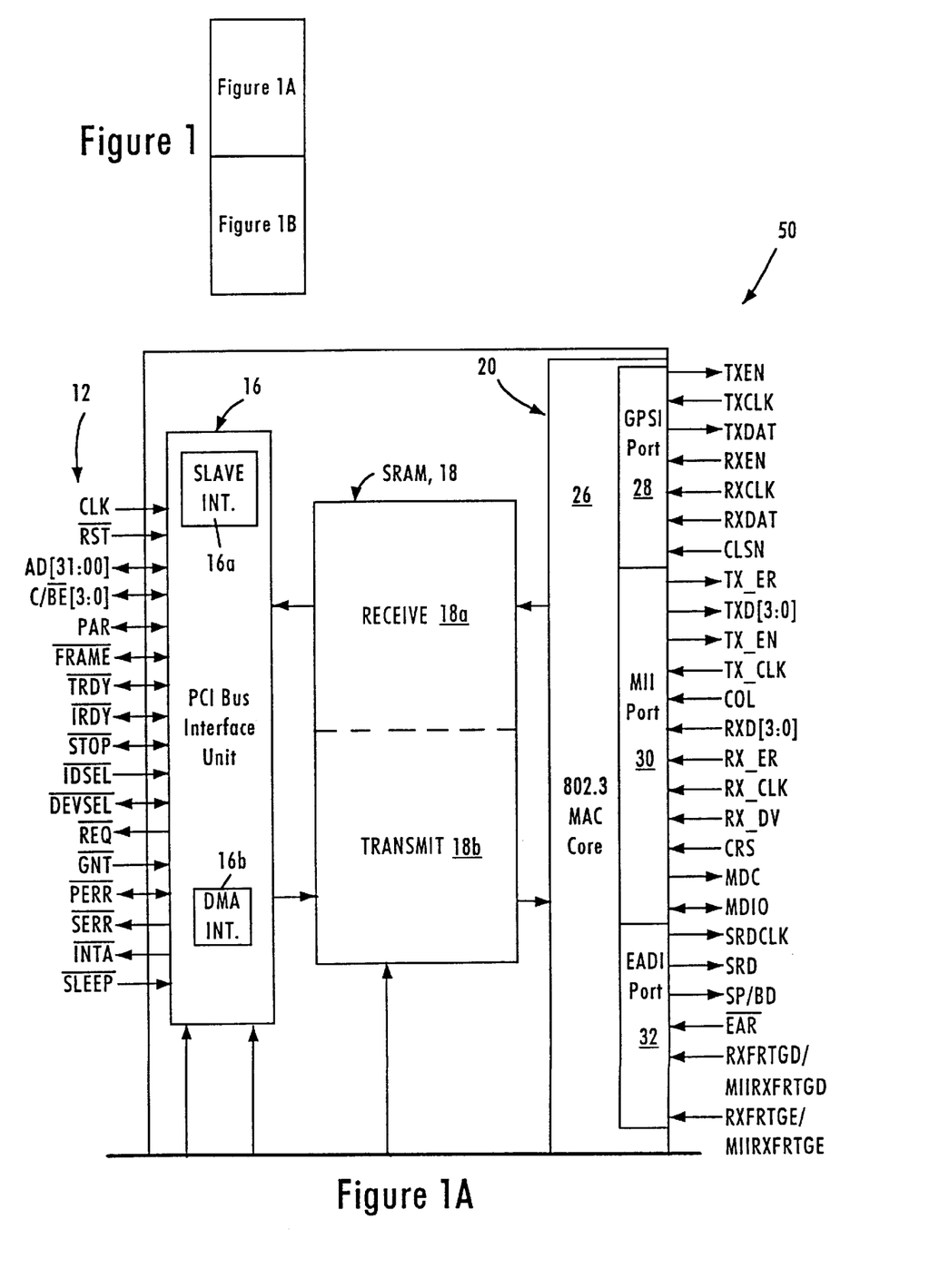
FIGS. 1, 1A and 1B are block diagrams illustrating an exemplary network interface which may be used for receiving the data packets according to an embodiment of the present invention.
Figure 1B:
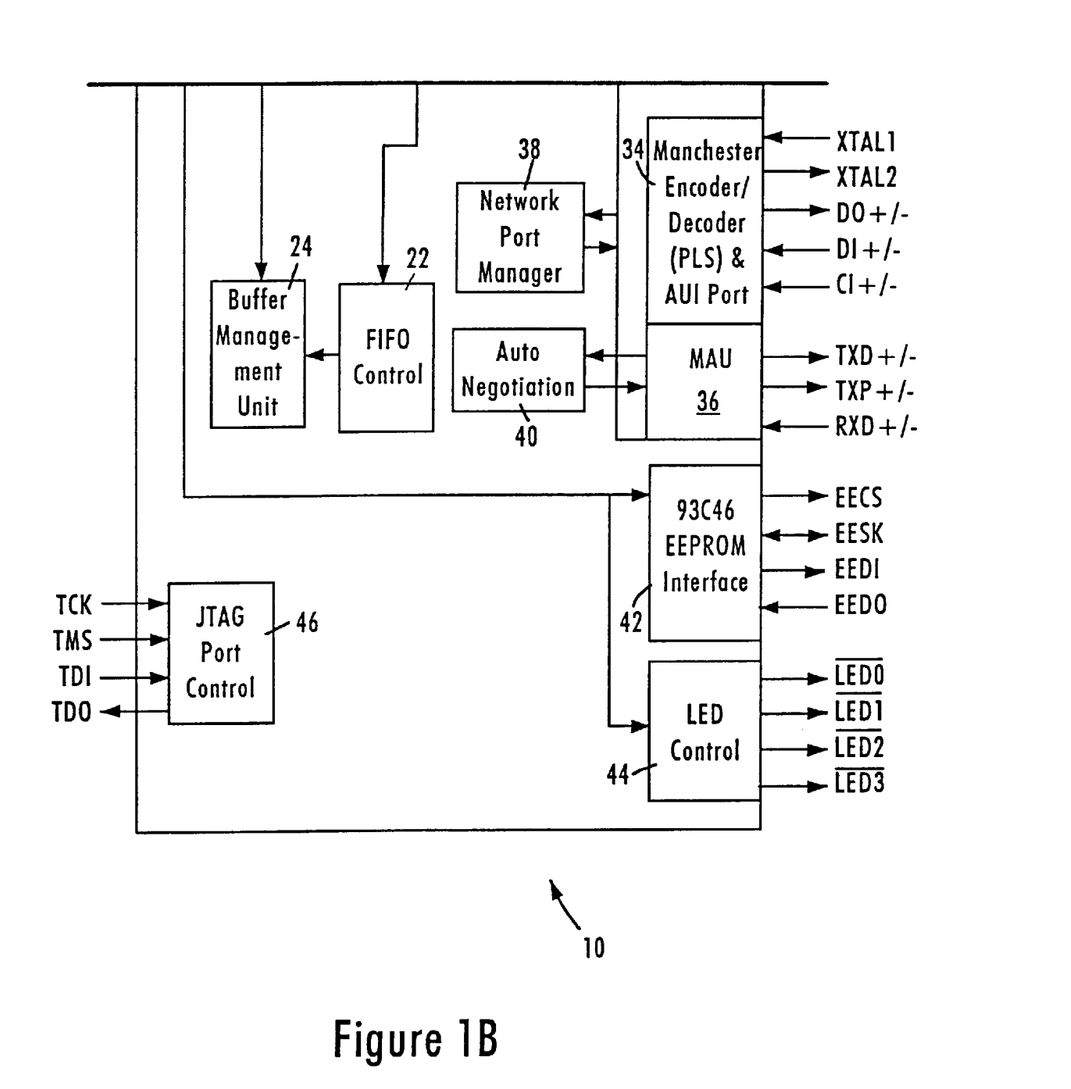

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

The memory portion 18 includes a 16-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down. Hence, the network interface can be configured to operate while the host computer is in a stand-by mode, enabling the network interface to output power up information to logic within the host computer to enable the host computer to automatically turn on in response to data packets received from the network and having a specific protocol, described below.

DETECTING PRESCRIBED PATTERNS IN A DATA STREAM

Figure 2:
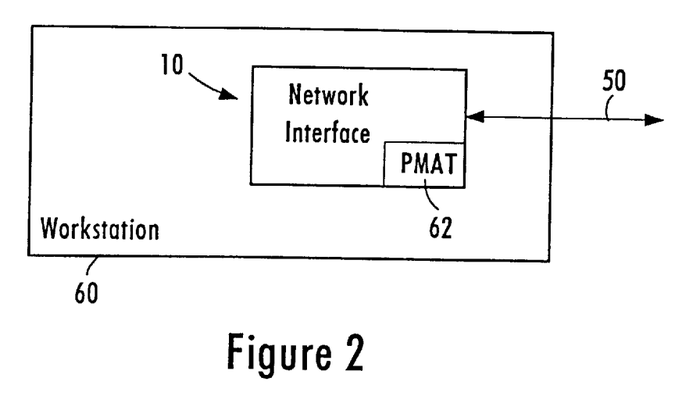
FIG. 2 is a diagram illustrating the relationship between the network interface of FIG. 1 relative to the host computer workstation, the network, and the pattern matching circuit used for wake-up procedures.

FIG. 2 is a block diagram illustrating the network interface 10 for a host computer 60 configured for automatically shutting down during periods of inactivity and automatically restarting in response to reception of a data packet by the network interface 10 having a prescribed pattern, described below.

As shown in FIG. 2, the network interface 10 includes a pattern matching circuit (PMAT) 62 configured for detecting one of a plurality of prescribed patterns from a data packet received from the network media 50. Various power management schemes may be used to perform different wake-up operations, depending upon the pattern identified in a received data packet.

Figure 3:
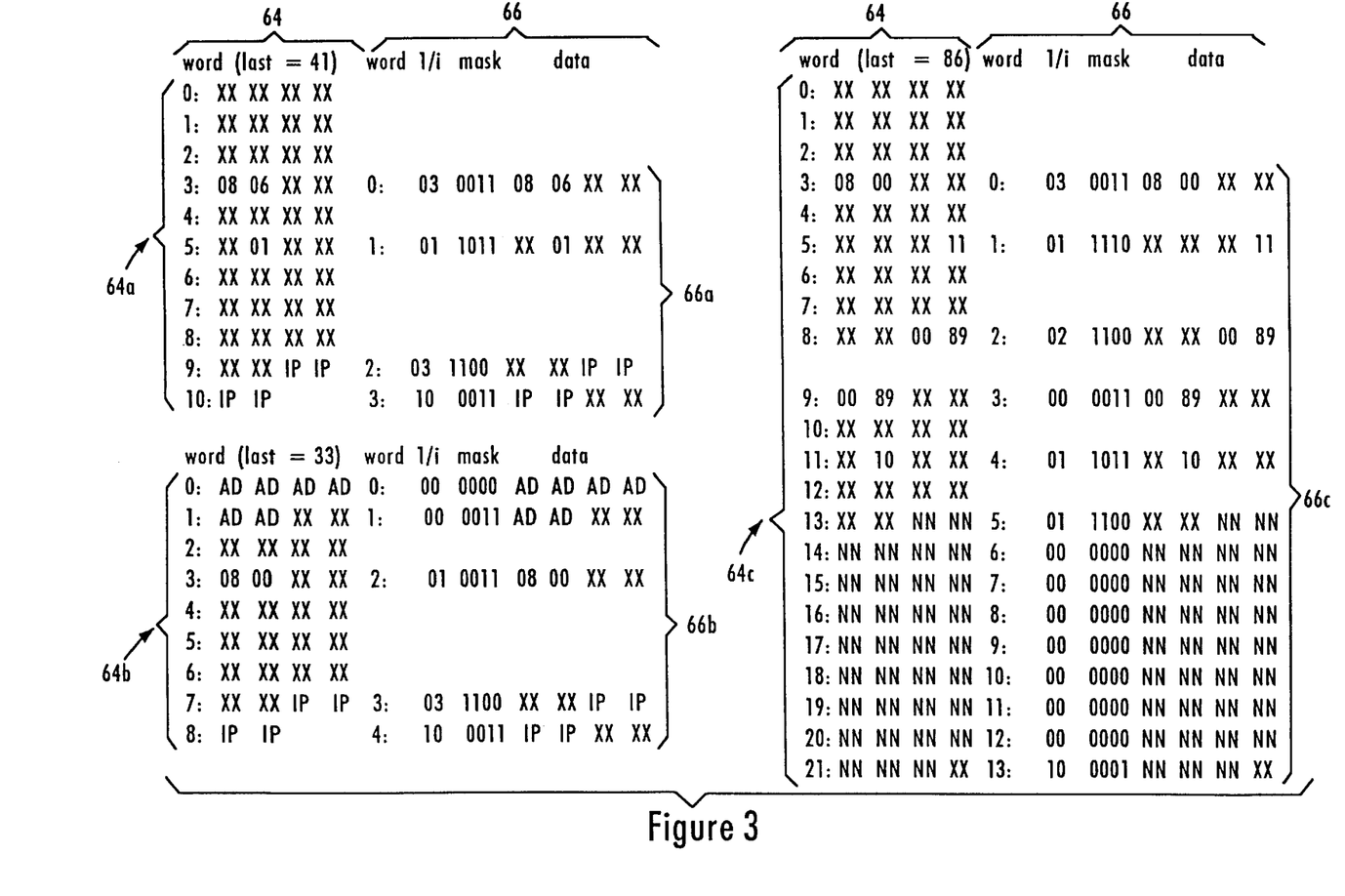
FIG. 3 is a diagram illustrating a comparison between a received data packet and a pattern entry stored in the pattern memory according to an embodiment of the present invention.

FIG. 3 illustrates three different pattern sequences 64 for a received data packet. For example, one type of power management packet specified by Microsoft Corporation includes a first pattern sequence 64a, where the last four bytes in words 9 and 10 are Internet Protocol-specific bytes, and where specific data pattern bytes are found in words 3 and 5 of the power management packet. The pattern sequence 64b specifies an alternative prescribed pattern, where the first six bytes of the received data packet include the value "AD" (hexadecimal) and words 3, 7, and 8 include prescribed data values. A similar pattern is described with respect to pattern 64c.

Figure 4:
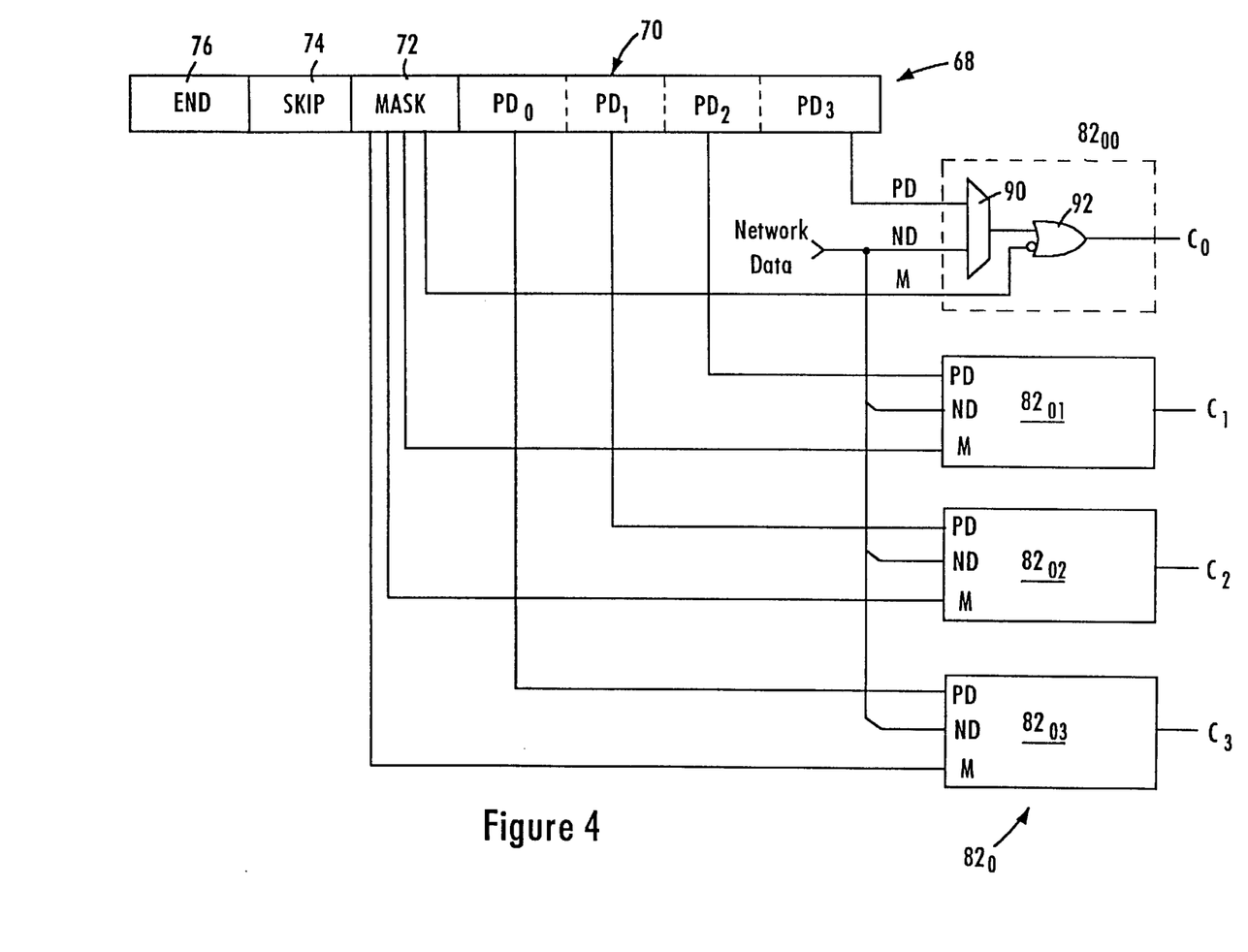
FIG. 4 is a diagram illustrating a relationship between a pattern entry and a pattern comparator.

According to the disclosed embodiment, pattern data associated with the prescribed patterns 64a, 64b, and 64c are compressed by storing in pattern memory a field specifying a number of bytes in the data stream to be ignored prior to comparison with a corresponding pattern data field. FIG. 4 is a diagram illustrating a structure of a pattern entry stored in a pattern memory that specifies at least a portion of the prescribed pattern. The pattern entry 66 includes a four-byte pattern data field 70, a four-bit mask field 72, a three-bit skip field 74, and a one-bit end field 76. The end field 76 and skip field 74 are shown in FIG. 3 as last/ignore count (L/I) fields, respectively. The skip field 74 (i.e., ignore count field) specifies a number of bytes in the data stream to be ignored prior to comparison with the pattern data field. For example, the prescribed pattern 64a in FIG. 3 has prescribed pattern data in the first two bytes of word 3 (e.g., 08 06), such that words 0, 1, and 2 of the power management packet according to pattern 64a include non-relevant, don't care data which can be ignored for pattern comparison purposes. Rather than wasting space in a pattern memory with null values, the disclosed embodiment sets the first pattern entry (i.e., word 0) of pattern entries 66a to have a value of "3" in the skip field 74. Hence, the value "3" in the skip field 74 (ignore count field) indicates that the first three words (word 0, word 1, and word 2) of pattern 64a should be ignored prior to comparison with the next contiguous group of data bytes in word 3 of stream 64a.

The next pattern entry (e.g., word 1) of the pattern entry 66a corresponding to the pattern 64a is then read from pattern memory. The skip field 74 of the next pattern entry (word 1) has a value of 1, indicating one group of data bytes (e.g., word 4 of pattern 64a) should be skipped or discarded before matching the next contiguous group of data bytes from the pattern stream (e.g., word 5) for comparison with the pattern date field "xx 01 xx xx."

Hence, the skip/ignore field 74 enables a comparator to selectively discard at least one group of contiguous data bytes from the data stream 64 based on the value in the skip/ignore field for the corresponding pattern entry.

As shown in FIGS. 3 and 4, the pattern entries 66 include a 4-bit mask field 72 indicating a don't care condition for selected bytes of the corresponding group of bytes compared with the pattern data field 70. For example, word 1 of the pattern entries 66a includes the pattern "xx 01 xx xx" and the corresponding mask field has the value "1011". A mask value of "1" corresponds to an ignore condition, and a mask value of "0" corresponds to a compare condition for the corresponding byte. Hence, the mask field pattern "1011" indicates that only the second pattern data byte "01" should be compared with the corresponding byte of the data stream, and that the remaining three data bytes are to be ignored in the comparison. Hence, the disclosed arrangement enables a plurality of pattern entries 66 arranged in a prescribed sequence to represent a prescribed pattern while minimizing the amount of space in a memory. The 3-bit skip field 74 enables a total maximum of seven words (28 bytes) to be skipped before making a comparison. The effective comparison can reduce the size of the three patterns 64a, 64b, and 64c from 168 bytes to 92 bytes of pattern data, resulting in a 45% reduction.

Figure 5:
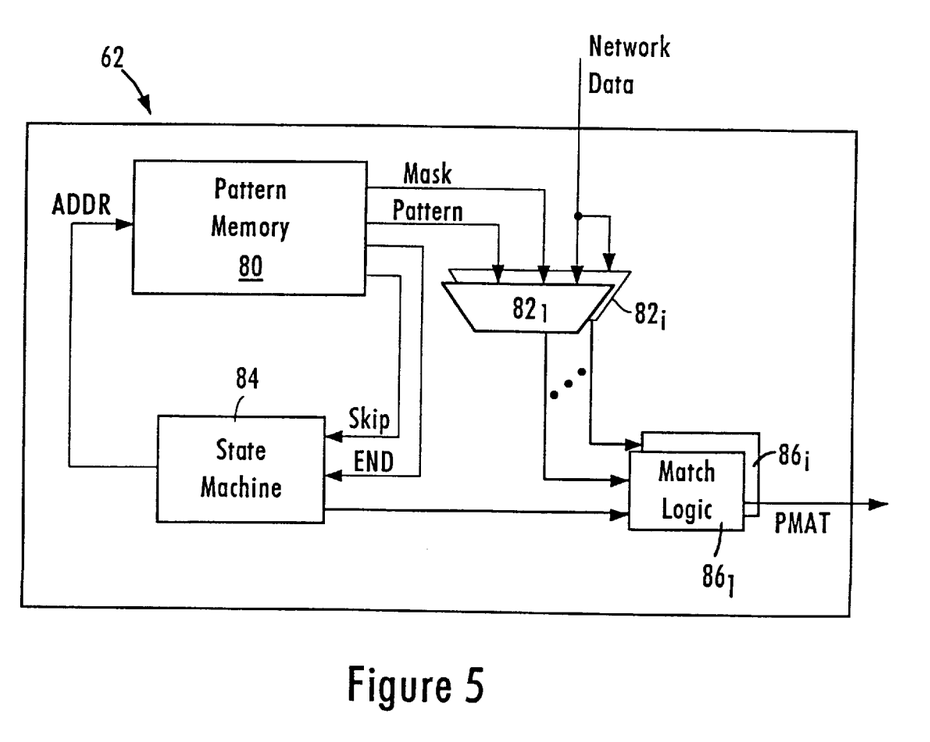
FIG. 5 is a block diagram illustrating the pattern matching circuit of FIG. 2 according to an embodiment of the present invention.

FIG. 5 is a block diagram illustrating the pattern match circuit 62 of FIG. 2 for detecting a prescribed pattern 66 in a data stream according to an embodiment of the present invention. The pattern match circuit 62 includes a pattern memory 80 configured for storing the pattern entries 66 of FIG. 3 that specify the respective patterns by using the skip/ignore field 74 to minimize the amount of required space in memory. The pattern match circuit 62 also includes at least one comparator 82 for comparing the pattern data field 70 of a selected one of the stored pattern entries 66 with a selected group of bytes from the packet data stream supplied from the media access controller (MAC) of FIG. 1. As shown in FIG. 5, the pattern match circuit may include a plurality of comparators $82_i$ enabling simultaneous comparison of the received data packet to respective prescribed patterns stored in the pattern memory 80. Hence, each of the patterns 66a, 66b, and 66c may be compared simultaneously to a received data packet using respective comparators $82_i$. According to the disclosed embodiment, the packet data is supplied from the MAC at a data rate of 1 nibble (4 bits) per clock, such that eight clock cycles are necessary to receive a single byte in the comparator. Hence, assuming one clock cycle to transfer mask and pattern data from the pattern memory 80 to the corresponding comparator 82, the pattern match circuit 62 can perform thirty-two (32) simultaneous 4-byte comparisons.

The pattern match circuit 62 also includes a state machine 84 configured for controlling the supply of the pattern entry date (e.g., pattern data field and mask field) of a selected pattern entry to the appropriate comparator $82_i$. The state machine selectively addresses the pattern entries 68 based on control entries stored in the pattern memory 80. Each control entry specifies whether a particular pattern is enabled for comparison, and the start location of the first corresponding pattern entry 68 (e.g., word 0). The state machine 84 tracks the progress of the comparison based on a clock signal synchronous to the input data clock from the MAC, and relative to the respective skip field 74 and the end bit 76 specifying an end of the pattern comparison in the last pattern entry.

The pattern match circuit 62 also includes match logic 86 that receives the comparison results from the comparators 82$_i$. The match logic 86 determines an end of the comparison results based on an end bit set in the end field 86 in one of the pattern entries. As described below, the match logic 86 monitors the comparison results to determine the presence of a no-match result in the comparison results from the comparators 82$_i$. The match logic 86 outputs a signal indicating detection of the prescribed pattern in response to detecting an end field in one of the pattern entries prior to determining the presence of the no-match result. As shown in FIG. 3, the end signal may be supplied as a strobe from the state machine 84. Alternatively, the end field may be supplied to the match logic 86 directly from the pattern memory 80. In addition, the match logic may output different types of match results, depending on the corresponding pattern having a match.

FIG. 4 illustrates in further detail the comparison between the pattern data and the input data stream from the packet data relative to the mask bits from the mask field 72. For example, FIG. 4 shows one of the comparators 82$_0$ configured for comparing the pattern data in the field 70 with the data stream from the network data packet on a byte-by-byte basis. For example, byte 0 of the pattern data field is compared with the corresponding byte in the data stream in byte comparator 82$_{00}$, byte 1 of the pattern data is compared with the corresponding byte of the input data stream in byte comparator 82$_{01}$, etc. Each byte comparator 82$_{01}$ includes an 8-bit comparator 90 that outputs a comparison result, and an OR gate 92 that receives comparison results and the corresponding mask bit from the mask field 72. Hence, if the corresponding mask bit is set to 1, the mask bit is output as the comparison result for the corresponding selected data byte, regardless of the corresponding comparison result. The 4-bit comparison result ($C_{0-3}$) is output to the match logic 86, where the value C equals 1 for a match or don't care condition, and C equals 0 only if there is no match.

Figure 6A:
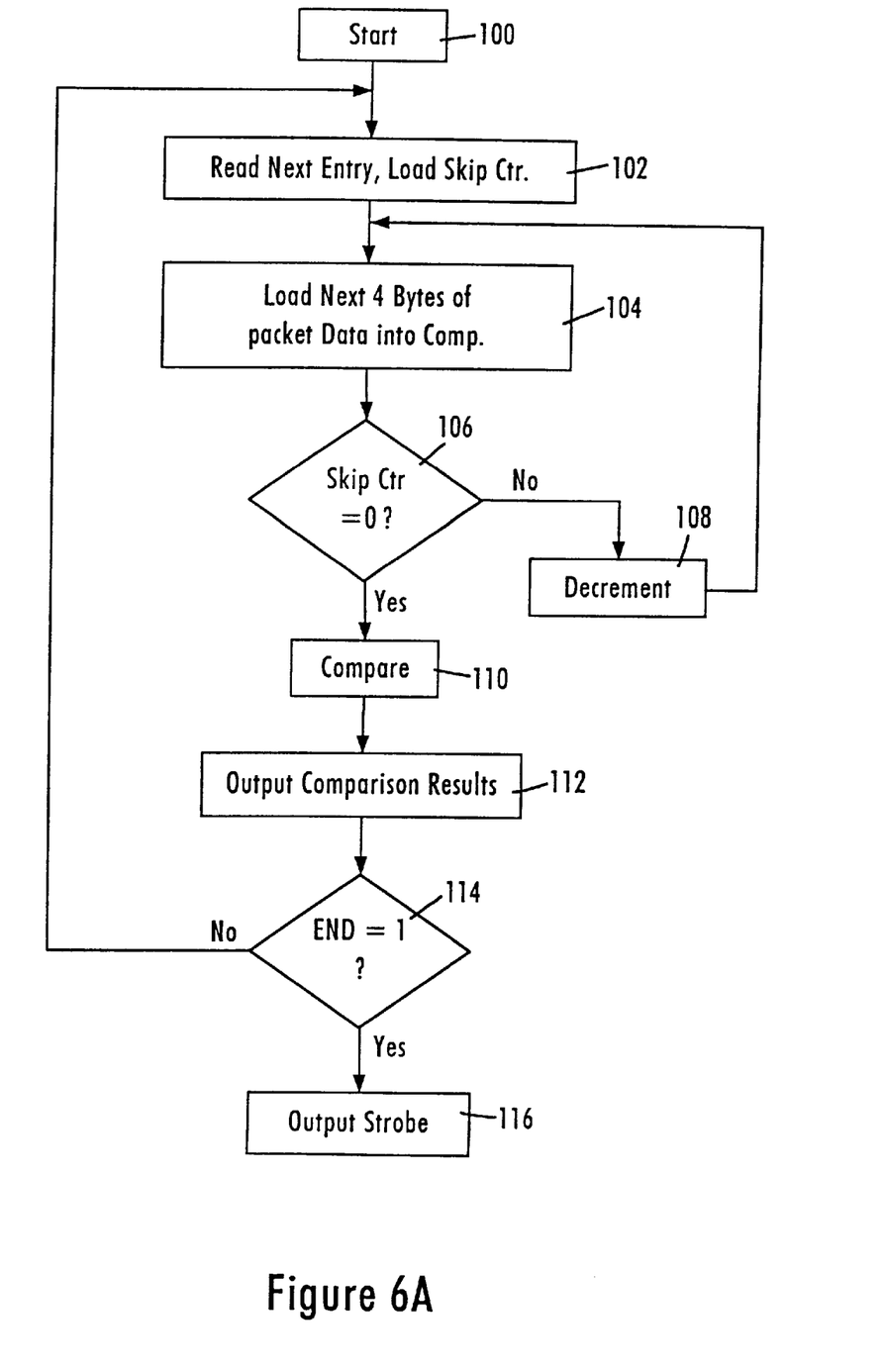
FIGS. 6A and 6B are diagrams illustrating a method for identifying a prescribed pattern in a data packet from the perspective of the state machine and match logic of FIG. 5, respectively.

FIG. 6A is a block diagram of a method for detecting a prescribed pattern in the data stream from the media access controller according to an embodiment of the present invention. The method starts with network interface initialization, where the host computer may power down to a standby state, for example after a period of inactivity. As described above, the network interface 10 will have a separate power supply configuration to operate independently of the workstation 60.

The actual method for detection starts in step 100 by synchronizing to the data clock from the media access controller and identifying a start of frame. Specifically, the pattern comparison is synchronized relative to the start position of the received data packet. As recognized in the art, the start of the data packet can be identified by the start frame delimiter at the beginning of the packet. The state machine 84 then reads the next pattern data entry 66 as specified by the control entries in the pattern memory 80. Thus, the state machine 84 reads the first pattern entry upon detecting a start of frame based upon the corresponding start address in the control entry for the enabled patterns. The state machine also loads an internal skip counter with the value of the skip/ignore field 74. The skip counter for pattern comparison may be maintained in the state machine 84, or alternatively in each comparator 82$_i$. The state machine loads the pattern data fields 70 and the mask field 72 into the appropriate comparator 82$_i$.

The pattern match circuit 62 then loads the next word (i.e., four bytes) of packet data into each comparator 82$_i$ in step 104. If in step 106 the skip counter for the corresponding comparator 82 is not equal to zero, the loaded group of contiguous data bytes is discarded from the corresponding comparator 82$_i$ and the skip counter is decremented in step 108. Hence, a 4-byte group of data bytes can be selectively discarded based on the skip/ignore field 74 specifying the number of 4-byte groups to be ignored prior to comparison with the pattern data field.

If in step 106 the skip counter for the corresponding comparator 82 equals 0, the loaded four bytes of packet data are latched into the corresponding comparator 82$_i$ in step 110, and the latched group of data is compared with corresponding pattern data from the pattern entry 66 on a byte-by-byte basis, as shown in FIG. 4. The comparator 82$_i$ outputs the byte comparison result in step 112 based on the corresponding mask bit from the mask field 72. If the state machine 84, or alternatively the corresponding comparator 82$_i$, detects the end field 76 set to 1 in step 114, and end of pattern strobe is output by either the state machine 84 or the corresponding comparator 82$_i$ to the match logic 86 indicating the end of pattern comparison in step 116.

Figure 6B:
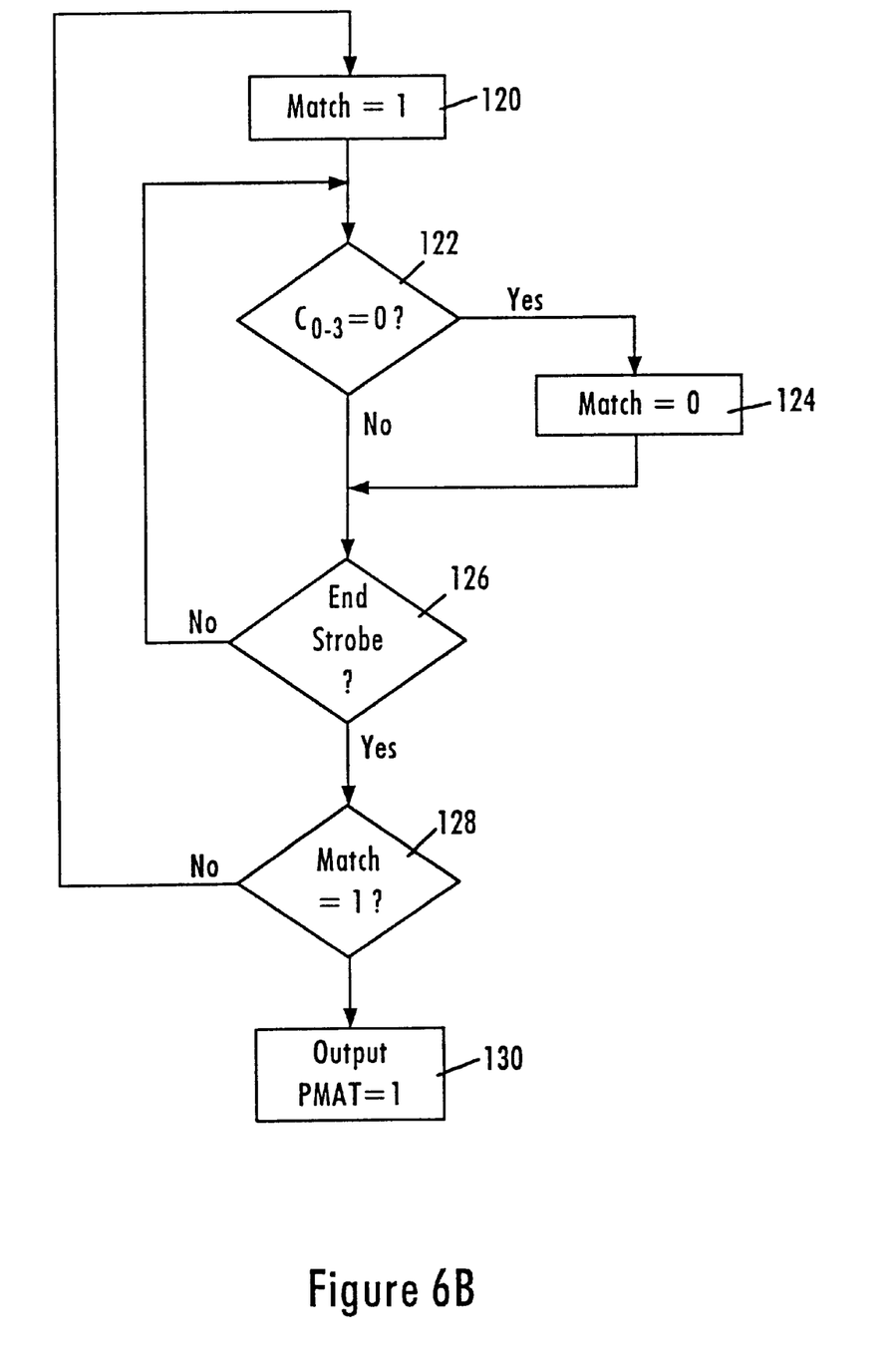

FIG. 6B is a block diagram illustrating the method for pattern matching from the perspective of the match logic 86. The match logic 86 resets a match flag to 1 in step 120, for example in response to a start of frame indication from the MAC. The match logic 86 then receives the comparison results ($C_{0-3}$) from the corresponding comparator 82$_i$, and checks in step 122 if any of the comparison result bits equal zero. If any of the comparison result bits equal zero indicating a no match detection, the match logic 86 sets the match flag equal to zero in step 124. The match logic 86 then determines whether an end of pattern strobe has been received from either the state machine 84 or the corresponding comparator 82$_i$ in step 126. If an end of pattern strobe has not been received by the match logic 86, the match logic continues to determine whether any of the next comparison results have a zero value. Upon detecting an end of pattern strobe in step 126, the match logic checks in step 128 if the match flag is still set to 1. If the match flag is still set to 1 in step 128, the match logic 86 outputs in step 130 a pattern match signal equal to 1, and may also include information specifying the specific pattern that was matched.

According to the disclosed embodiment, an arrangement for detecting a prescribed pattern in a data stream compresses the pattern data in a pattern memory by including a skip/ignore field specifying a number of bytes in the data stream that may be ignored prior to comparison with the stored pattern data field. The skip/ignore field in the comparison operation is synchronized with the start of the data stream, enabling simultaneous pattern comparisons in parallel using minimal logic or memory space.

Although the disclosed arrangement was described with respect to detecting a predetermined pattern with respect to wake-up logic for a workstation connected to a network, it will be appreciated that the arrangement for detecting a prescribed pattern can be applied to other pattern recognition schemes for synchronous data streams.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for detecting a prescribed pattern in a data stream, comprising:
 a pattern memory configured for storing a pattern entry specifying at least a portion of the prescribed pattern, the pattern entry including a pattern data field and a second field specifying a number of bytes in the data stream to be ignored prior to comparison with the pattern data field; and
 a comparator for comparing the pattern data field with a selected contiguous group of bytes of the data stream based on the second field and outputting a comparison result.

2. The apparatus of claim 1, wherein the comparator latches the selected contiguous group of bytes based on the second field and relative to a beginning of the data stream.

3. The apparatus of claim 2, wherein:
 the pattern memory comprises a plurality of said pattern entries for identifying the prescribed pattern from a respective plurality of the selected contiguous groups of bytes, each of said pattern entries further comprising a mask field indicating a don't care condition for selected bytes of the corresponding selected contiguous group of bytes relative to the pattern data field; and
 the comparator generates the comparison result for each corresponding selected contiguous group of bytes based on the corresponding mask field.

4. The apparatus of claim 3, further comprising match logic configured for detecting the prescribed pattern based on the comparison results generated for the respective pattern entries, the match logic determining an end of the comparison results based on an end bit set in one of the pattern entries.

5. The apparatus of claim 3, further comprising a state machine configured for controlling supplying of the pattern data field and the mask field of a selected one of the pattern entries to the comparator, the state machine accessing the pattern entries in a prescribed sequence relative to the prescribed pattern.

6. The apparatus of claim 5, wherein the pattern memory stores groups of pattern entries for respective prescribed patterns, and a control entry, the state machine selecting one of the group of pattern entries for detecting the corresponding prescribed pattern based on the control entry.

7. The apparatus of claim 3, wherein the comparator includes a plurality of byte comparators for generating the comparison result for each corresponding selected contiguous group of bytes on a byte-by-byte basis.

8. The apparatus of claim 7, wherein each byte comparator includes bypass logic for generating a prescribed comparison result in response to a corresponding bit from the mask field.

9. The apparatus of claim 1, wherein the second field specifies a consecutive number of data byte groups to be ignored prior to comparison with the pattern data field.

10. The apparatus of claim 9, wherein the comparator receives the data stream from a media access controller, the comparator selectively discarding the data byte groups to be ignored based on the second field and in response to a receive clock signal from the media access controller.

11. A method for detecting a prescribed pattern in a data stream, comprising:
 storing in a memory a plurality of pattern entries having a sequence corresponding to the prescribed pattern, each pattern entry including a pattern data field storing pattern bytes corresponding to the prescribed pattern and a second field storing a second field value;
 receiving the data stream;
 reading a selected one of the pattern entries based on a start position of the received data stream;
 selectively discarding at least one group of contiguous data bytes from the data stream based on the second field of the corresponding one pattern entry;
 comparing the pattern bytes from the one pattern entry with a second group of data bytes from the data stream, contiguous with and following the selectively discarded group, and outputting a comparison result; and
 detecting the prescribed pattern in the data stream based on the detected comparison results for the respective pattern entries.

12. The method of claim 11, further comprising identifying a last of the pattern entries for the sequence based on a detected end bit in the last pattern entry.

13. The method of claim 11, wherein the comparing step comprises:
 comparing each of the pattern bytes with a corresponding one of the second group of data bytes;
 selectively outputting the comparison result for said each pattern byte based on a corresponding mask bit stored in the corresponding pattern entry.

14. The method of claim 13, wherein the selectively discarding step comprises:
 identifying a discard value of the second field; and
 discarding the at least one group of contiguous data bytes based on the discarded value, the number of discarded groups corresponding to the discard value.

15. The method of claim 11, wherein the receiving step comprises receiving the data stream from a media access controller receiving data packets from a network media.

16. A method in a network interface for identifying a prescribed pattern in a data packet, comprising:
 receiving the data packet by a media access controller from a packet switched network; and
 detecting the prescribed pattern in the received data packet, comprising:
  (1) reading a selected pattern entry, based on a start position of the received data packet, from a memory storing a plurality of the pattern entries having a prescribed sequence corresponding to the prescribed pattern,
  (2) selectively latching a group of data bytes from the data packet based on a skip field in the selected pattern entry,
  (3) selectively comparing the latched group of data bytes from the data packet with pattern data in the selected pattern entry based on corresponding mask bits in the selected pattern entry to obtain a comparison result relative to the selected pattern entry; and
  (4) accumulating the comparison results for the respective pattern entry relative to the prescribed sequence and the contiguous groups of data bytes, to detect the prescribed pattern.

17. The method of claim 16, wherein the accumulating step comprises:
 determining a presence of a no-match result in the comparison results; and
 outputting a signal indicating detection of the prescribed pattern in response to detecting an end field in one of the pattern entries prior to determining the presence of the no-match result.

18. The method of claim 16, wherein the selectively comparing step comprises outputting the mask bit as the comparison result for the corresponding selected data byte of the next contiguous group in response to setting of the mask bit.

19. The method of claim 16, wherein the selectively comparing step comprises comparing the latched group in a first comparator.

20. The method of claim 19, further comprising simultaneously comparing the received data packet to a second prescribed pattern, comprising:

(1) reading a second selected pattern entry from said memory for a second plurality of pattern entries for the second prescribed pattern;

(2) selectively latching a second group of data bytes from the data packet based on the corresponding skip field of the second selected pattern entry;

(3) selectively comparing the latched second group of data bytes with the pattern data in the second selected pattern entry for detection of the second prescribed pattern.

\* \* \* \* \*